United States Patent
Nilsson

(10) Patent No.: US 8,091,511 B2
(45) Date of Patent: Jan. 10, 2012

(54) METHOD OF CLEANING ANIMAL CAGES

(75) Inventor: Magnus Nilsson, Rydsgård (SE)

(73) Assignee: Detach AB, Strängnäs (SE)

( * ) Notice: Subject to any disclaimer, the term of this patent is extended or adjusted under 35 U.S.C. 154(b) by 582 days.

(21) Appl. No.: 12/267,018

(22) Filed: Nov. 7, 2008

(65) Prior Publication Data

US 2010/0107988 A1    May 6, 2010

(30) Foreign Application Priority Data

Nov. 3, 2008  (SE) .................. 0802332-7

(51) Int. Cl.
*A01K 1/01* (2006.01)
(52) U.S. Cl. .................. 119/458; 119/479
(58) Field of Classification Search .......... 119/458, 119/452, 843, 442, 455, 457, 479, 161
See application file for complete search history.

(56) References Cited

U.S. PATENT DOCUMENTS

| | | | | | |
|---|---|---|---|---|---|
| 5,771,840 | A | * | 6/1998 | Pelletier | 119/452 |
| 6,129,099 | A | * | 10/2000 | Foster et al. | 134/57 R |
| 6,394,033 | B1 | | 5/2002 | Trogstam et al. | |
| 6,553,939 | B1 | * | 4/2003 | Austin et al. | 119/455 |
| 6,634,507 | B1 | * | 10/2003 | Høst-Madsen et al. | 209/702 |
| 7,114,462 | B2 | * | 10/2006 | Austin et al. | 119/458 |
| 7,118,474 | B2 | * | 10/2006 | Bjordal | 454/238 |
| 7,621,285 | B2 | * | 11/2009 | Robert et al. | 134/61 |
| 2007/0110382 | A1 | | 5/2007 | Ikemoto et al. | |

* cited by examiner

*Primary Examiner* — T. Nguyen
(74) *Attorney, Agent, or Firm* — Dickstein Shapiro LLP

(57) ABSTRACT

The invention relates to a method of cleaning animal cages, wherein a robot empties each cage from dirty bedding, puts the cage in a batch washing machine, and after a wash cycle, the washing machine is emptied and the cages are filled with clean bedding, manually or with the aid of a robot.

5 Claims, No Drawings

METHOD OF CLEANING ANIMAL CAGES

DESCRIPTION

The present invention relates to a method of cleaning animal cages, and more specifically the removal of dirty bedding from the cages and subsequent refilling of the cages after washing thereof with clean bedding.

PRIOR ART

In order to protect operators from airborne particles and potential allergens, great efforts have been made in the past to design fully automatic systems and methods for cleaning animal cages and taking care of dirty bedding as well as filling the clean cages with clean bedding. One such method and system is disclosed in U.S. Pat. No. 6,394,033 B1. The system according to said U.S. patent has a dirty side and a clean side, which are completely separated from each other. Cages are transported on a conveyor into the dirty side, wherein a robot picks up each cage, empties the cage into a vacuum operated dump station and then places the cage on the conveyor of a tunnel washer. The cages leave the tunnel washer on a clean side, where a second robot picks up each cage, places each cage in a filling station for clean bedding, and then puts the cage on a pallet.

Although the above system works well, and is well suited for large facilities, there are some drawbacks. When using a conveyor for transporting cages with dirty bedding into the "dirty" side, there is unavoidably an opening where the conveyor enters the dirty room. This means there is a potential risk for particulate matter to escape into the surrounding atmosphere and accordingly also potential allergens.

Another drawback, at least for small facilities, is that the above disclosed prior art system takes up a lot of space, it is a large and complicated installation, and accordingly the installation costs are high, as well as the operation costs.

SUMMARY OF THE INVENTION

One object of the invention is to provide a method of cleaning animal cages minimizing the risk for waste material to escape from the dirty side into the surrounding atmosphere.

Another object of the invention is to provide a method of cleaning animal cages which is suitable also for small facilities.

The above and other objects are achieved with the method according to the present invention comprising the following steps:

providing a suitable transportation means, such as a pallet filled with cages containing dirty bedding material;
introducing said transportation means into a room defining a dirty side of a cleaning installation, featuring a robot handling equipment;
sealing said room and automatically emptying said cages with the aid of said robot handling equipment, said robot gripping the cages, emptying them over a dirty bedding receiving dump station, and in a next step placing them in a batch washing machine, until said washing machine is full;
starting said batch washing machine for performing a washing cycle;
removing washed cages from said washing machine; and
filling the clean cages with clean bedding material.

The use of a washing machine which washes the cages in batches according to the invention gives the benefit that the area taken up by the washing equipment is reduced radically.

Further, the room defining the dirty side of the installation can be hermetically sealed during the operation of emptying the dirty cages into the dump station, which is vacuum operated, as is disclosed in the above cited U.S. patent. This makes it possible to handle dirty animal cages safely with minimal space requirements and at reasonable installation costs, and accordingly also small facilities can afford a very high safety for personnel.

According to one embodiment of the invention, the clean cages are removed manually from the washing machine, and are manually filled with clean bedding material.

According to a preferred embodiment of the invention, after that the washed cages have been filled with clean bedding, the cages are subjected to a sterilization step.

In one aspect of the invention, the washing machine is emptied from the opposite side of the washing machine in view of the filling side, into a so called clean area.

In another aspect of the invention, the washing machine is emptied from the same side as the filling side, the dirty area becoming the clean area, during the emptying process.

Furthermore, the washed cages can be removed from the washing machine manually or with a robot handling equipment, on the same side that was used for filling the washing machine, thus the dirty side becoming the clean side during the emptying of the washing machine.

According to another embodiment of the invention, the clean cages are removed from the washing machine using a robot handling equipment, which is also used to fill the clean cages with clean bedding material, before placing the cages on a suitable transportation means. This applies for both aspects of the invention, that is when the washing machine is emptied from the opposite side of the washing machine from the filling side, and when it is filled and emptied on one and the same side.

This embodiment has a number of advantages in that only one robot handling equipment is used both for filling the washing machine with dirty cages as well as removing clean cages from the washing machine. This radically reduces the installation costs, while at the same time the space requirement is further reduced.

In this context it should be emphasized that the dirty side is not dirty in the normal sense of the word, but during the emptying phase there may be particles in the surrounding atmosphere being hazardous to people. After the last cage has been put into the washing machine, the ventilation system will remove any remaining particles, and the area will be safe for operators, i.e. a clean area.

Other embodiments will be apparent from the following detailed description of the invention.

DETAILED DESCRIPTION OF PREFERRED EMBODIMENTS OF THE INVENTION

In order to illustrate the present invention the process that starts with cages filled with dirty bedding and goes all the way to clean cages filled with clean bedding will be described schematically. The control system and the devices used are not part of the invention and will therefore not be described in detail.

An automated cage washing system with robots is used and thus it is necessary to be able to identify all parts to make sure that the robots know what comes through the system, which is done by using special designed transportation means, such as pallets, for each type of animal cages. The transportation means will also hold the stacked cages in a known position so the robot easily can find and process the cages.

The operator loads the transportation means in specified load positions. The transportation means is then introduced into an enclosed space on the dirty side of the system, through e.g. a door or sluice. The robot will pick up dirty cages and move the cages to a dump station for emptying the dirty bedding into the dump station. Preferably the robot will automatically start the dump station with its mill.

According to a preferred embodiment of the invention, the robot will pick up the cages one by one, because then the size of the robot can be minimized.

The dump station may be of the kind described in the above mentioned U.S. patent, having a mill for the decomposition of the dirty bedding, to be sucked by vacuum to an outside unit. However, it could also be only a dust bin, which is taken care of when it is full. When a cage is empty the robot will place the cage on a shelf in a cabinet washer. The shelves in the washer are specially designed for fitting the cages and interact with the robot gripper when loading cages.

The dirty side robot sends information to the washer when the washer is fully loaded, the door in the washer will automatically close and processing will start.

When operating the clean side manually, the operator on the clean side will be alerted when the washer has completed the cycle, and the operator will manually unload the washer.

Manually operation of a bedding dispenser will be performed by choosing the right volume of bedding at a selector switch with preset volumes of bedding. When the cage is put under a feeder e.g. a micro switch is activated and the cage will be filled with the desired amount of clean bedding.

Particles of clean bedding material may then also escape into the surrounding atmosphere and may also be potential allergens. Accordingly, in order to address this problem also the clean side may be automated, using a robot to unload the washer and to fill each cage with the desired amount of clean bedding material, in a sealed room or chamber, and to place each cage in a transportation means which when full is taken out of said room by an operator.

With the concept according to the invention, when using a robot both on the dirty side of the cabinet washer and on the clean side of the cabinet washer, the space required for the whole installation can be estimated to about the same space that is required for a tunnel washer, and thus the space requirement is about ⅓ of the space required for the tunnel washer solution.

At the same time, a very high security level in view of allergens and microorganisms is achieved.

By using the same robot handling equipment for filling and emptying the cabinet washer (batch washing machine), and thus the confined space being used alternately as a dirty space and as a clean space, the space requirement for the installation as a whole will be minimized, and the use of the robot handling equipment will be optimized.

In order to further reduce installation costs and space requirements, a robot handling equipment handling one cage at the time is used. Such a robot is smaller that a robot handling two or more cages at a time, the control system and the technical features of the robot will be smaller and less complicated. The use of a one cage handling robot to fill the washing machine and also to empty said machine from one and the same side will result in a very cost efficient installation taking up a minimum of space.

The invention claimed is:

1. A method of cleaning animal cages, involving the removal of dirty bedding from the cages, washing of the cages and subsequent refilling the cages with clean bedding, comprising the steps of:

providing a transportation means, such as a pallet, filled with cages containing dirty bedding material;

introducing said transportation means into a room defining a dirty side of a cleaning installation, featuring a robot handling equipment;

sealing the room defining the dirty side after introduction of the cages into said room;

emptying said cages with the aid of said robot handling equipment, said robot gripping each cage, emptying it over a dirty bedding receiving dump station;

placing the emptied, dirty cages into a batch-wise working washing machine until said washing machine is full, and starting of the batch-wise working washing machine for performance of a washing cycle; and removing washed cages from said washing machine into a clean side of said cleaning installation, wherein the cages are introduced into and removed from the washing machine on one and the same side of the washing machine so that the room alternatively functions as a dirty area and a clean area; and filling the clean cages with clean bedding material.

2. The method according to claim 1, wherein the clean cages are removed manually from the washing machine, and are manually filled with clean bedding material, and are then placed on a suitable transportation means.

3. The method according to claim 1, wherein the clean cages are removed from the washing machine and are filled with clean bedding material with the aid of a robot handling equipment, which then places the filled cages on a suitable transportation means.

4. The method according to claim 1, wherein one robot handling equipment is used both for filling and for emptying the washing machine.

5. The method according to claim 1, comprising, as a further step, sterilizing the washed cages filled with clean bedding.

\* \* \* \* \*